United States Patent
Jovanovic et al.

(10) Patent No.: US 10,763,750 B1
(45) Date of Patent: Sep. 1, 2020

(54) NOISE SUPPRESSION IN VOLTAGE REGULATOR CIRCUITS

(71) Applicant: Apple Inc., Cupertino, CA (US)

(72) Inventors: Nikola Jovanovic, Rottach Egern (DE); Michael Couleur, Reutlingen (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/375,847

(22) Filed: Apr. 4, 2019

(51) Int. Cl.
*H02M 3/158* (2006.01)
*H02M 3/157* (2006.01)
*G06F 1/26* (2006.01)
*G05F 3/26* (2006.01)
*H02M 1/00* (2006.01)

(52) U.S. Cl.
CPC .......... *H02M 3/1584* (2013.01); *G05F 3/262* (2013.01); *G06F 1/26* (2013.01); *H02M 3/157* (2013.01); *H02M 2001/0009* (2013.01); *H02M 2001/0025* (2013.01)

(58) Field of Classification Search
CPC ....... H02M 3/156–158; H02M 3/1584; H02M 3/1588; H02M 2001/0009; H02M 2001/0025; G05F 1/26; G05F 3/262; H02J 1/102; Y02B 70/1466
USPC .................................................. 323/272–285
See application file for complete search history.

(56) References Cited

U.S. PATENT DOCUMENTS

| | | | | |
|---|---|---|---|---|
| 3,543,139 A * | 11/1970 | Greene | ............. | H02M 3/33561 307/24 |
| 3,978,393 A * | 8/1976 | Wisner | ................. | H02H 7/1213 323/272 |
| 4,672,300 A | 6/1987 | Harper | | |
| 7,068,094 B1 * | 6/2006 | Jamal | ...................... | H02M 3/07 327/536 |
| 7,863,880 B1 | 1/2011 | Sutardja et al. | | |
| 8,665,002 B2 | 3/2014 | Li et al. | | |
| 9,525,351 B2 | 12/2016 | Li et al. | | |
| 9,685,864 B2 * | 6/2017 | Lerdworatawee | .... | H02M 3/158 |
| 2012/0126773 A1 * | 5/2012 | Philbrick | .............. | H02M 3/156 323/286 |
| 2015/0102780 A1 * | 4/2015 | Bauer | ................... | H02M 3/158 320/166 |
| 2018/0041118 A1 * | 2/2018 | Cohen | ..................... | H02M 1/08 |

OTHER PUBLICATIONS

Suhwan Kim, et al., "Reducing Ground-Bounce Noise and Stabilizing the Data-Retention Voltage of Power-Gating Structures," IEEE Transactions on Electron Devices, vol. 55, No. 1, Jan. 2008, pp. 197-205.

\* cited by examiner

*Primary Examiner* — Yemane Mehari
(74) *Attorney, Agent, or Firm* — Kowert, Hood, Munyon, Rankin & Goetzel, P.C.

(57) ABSTRACT

A power converter circuit included in a computer system may charge and discharge a switch node coupled to a regulated power supply node via an inductor. During a discharge cycle, the power converter circuit may sense a current being discharge from the regulated power supply node through the inductor into a ground supply node. The power converter circuit may also sense a noise current flowing in the ground supply node, and generate a control current using both the current being discharge and the noise current. Using the control current, the power converter circuit may halt the discharge cycle.

20 Claims, 6 Drawing Sheets

NOISE SUPPRESSION IN VOLTAGE REGULATOR CIRCUITS

BACKGROUND

Technical Field

This disclosure relates to power management in computer systems and more particularly to voltage regulator circuit operation.

Description of the Related Art

Modern computer systems may include multiple circuits blocks designed to perform various functions. For example, such circuit blocks may include processors, processor cores configured to executed execute software or program instructions. Additionally, the circuit blocks may include memory circuits, mixed-signal or analog circuits, and the like.

In some computer systems, the circuit blocks may be designed to operate at different power supply voltage levels. Power management circuits may be included in such computer systems to generate and monitor varying power supply voltage levels for the different circuit blocks.

Power management circuits often include one or more power converter circuits configured to generated regulator voltage levels on respective power supply signals using a voltage level of an input power supply signal. Such regulator circuits may employ multiple passive circuit elements, such as inductors, capacitors, and the like.

SUMMARY OF THE EMBODIMENTS

Various embodiments for generating a regulated power supply voltage level are disclosed. Broadly speaking, a voltage regulator circuit, that includes a switch node coupled to a regulated power supply node via an inductor, may be configured, in response to an initiation of a discharge cycle, to discharge the switch node into a ground supply node. A sense circuit may be configured to sense a discharge current flowing from the switch node to the ground supply node and modify the discharge current using a ground noise current flowing in the ground supply node to generate a control current. A control circuit may be configured to halt, based on a value of the control current, the discharge cycle. In another embodiment, to modify the discharge current, the sense circuit may be further configured to subtract the ground noise current from the discharge current. In some embodiments, the sense circuit may be further configured to generate an output signal whose voltage level is based on the value of the control current.

Figure 1:
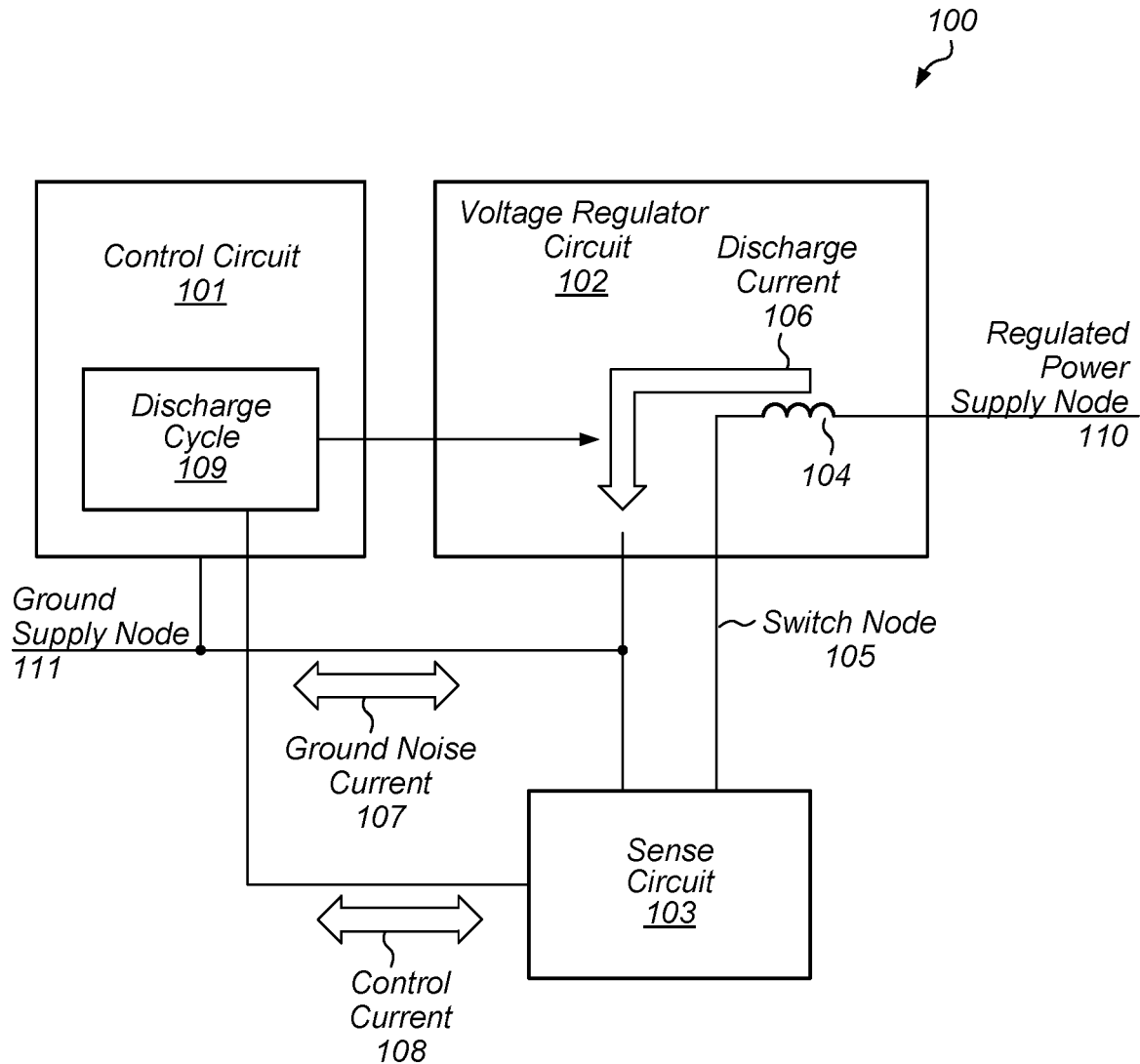
FIG. 1 is a block diagram of an embodiment of a power converter circuit for a computer system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

Computer systems may include multiple circuit blocks configured to perform specific functions. Such circuit blocks may be fabricated on a common substrate and may employ different power supply voltage levels. Power management units (commonly referred to as "PMUs") may include multiple voltage regulator circuits configured to generate regulated voltage levels for various power supply signals. Such voltage regulator circuits may employ both passive circuit elements (e.g., inductors, capacitors, etc.) as well as active circuit elements (e.g., transistors, diodes, etc.).

Different types of voltage regulator circuits may be employed based on power requirements of load circuits, available circuit area, and the like. One type of commonly used voltage regulator circuit is a buck converter circuit. Such converter circuits include multiple devices and a switch node that is coupled to a regulated power supply node via an inductor. Particular devices are then activated to periodically charge and discharge the switch node in order to maintain a desired voltage level on power supply node.

To determine the duration of either the charge cycle or discharge cycle, a feedback look may be employed. Such feedback loops compare an operating parameter of the voltage regulator circuit to a reference value, and based on results of the comparison, halt either the charge or discharge cycle. In some cases, current begin sourced to the load through the inductor is measured during a charge cycle (referred to as "peak control"), while in other cases, the current being sunk from the load through the inductor is measured during a discharge cycle (referred to as "valley control").

In power converter circuits employing valley control, the discharge current through the inductor is compared against a reference value. When the discharge current reaches the reference value, the discharge cycle is halted. To measure the discharge current an amplifier may be coupled to the driver side of the inductor (referred to herein as the "switch node"). Such amplifier circuits, however, are susceptible to noise on a ground supply node used by the amplifier circuits. Noise may be generated on the ground supply noise by other voltage regulator circuits coupled to the same ground supply node or other driver portions of the regulator circuits (referred to as "phase circuits" or "phase units"). Such noise can result in determining an incorrect value for the discharge current, resulting in the discharge cycle termination too soon or being active for too long.

The embodiments illustrated in the drawings and described below may provide techniques for operating a voltage regulator circuit, which includes compensating for noise in a ground supply node, thereby improving measurement accuracy of the discharge current, which improves the performance of the voltage regulator circuit.

A block diagram depicting an embodiment of a power converter circuit is illustrated in FIG. 1. As illustrated, power converter circuit 100 includes control circuit 101, voltage regulator circuit 102, and sense circuit 103.

Voltage regulator circuit 102 includes switch node 105 coupled to regulated power supply node 110 via inductor 104. In various embodiments, voltage regulator circuit 102 is configured, in response to an initiation of discharge cycle 109, to discharge switch node 105 into ground supply node 111. It is noted that although a single voltage regulator circuit is depicted in the embodiment of FIG. 1, in other embodiments, multiple voltage regulator circuits with corresponding sense circuits (collectively "phase units" or "phase circuits") may be coupled to regulated power supply node 110 and operated with different timings (or "phases").

Sense circuit 103 is configured to sense discharge current 106 from switch node 105 to ground supply node 111, and modify discharge current 106 using ground noise current 107 to generate control current 108. In various embodiments, sense circuit 103 may be configured to subtract ground noise current 107 from discharge current 106 to generate control current 108. In some cases, sense circuit 103 may generate an output signal whose voltage level is based on the value of control current 108.

As described below in more detail, sense circuit 103 may include multiple amplifier circuits used to generate currents based on voltage levels of switch node 105 and ground supply node 111. Additionally, sense circuit 103 may include one or more digital-to-analog converter circuits used to adjust the current gain of one or both of control current 108 and ground noise current 107 by generating respective currents whose values are multiples of the values of control current 108 and ground noise current 107.

Control circuit 101 is configured to halt, based on a value of control current 108, discharge cycle 109. In various embodiments, control circuit 101 may include one or more state machines or other sequential logic circuits configured to begin and end both charge and discharge cycles of voltage regulator circuit 102. In some cases, control circuit 101 may employ one or more timing or clock signals (not shown) to initiate the charge and discharge cycles. As described below in more detail, control circuit 101 may include comparator circuits configured to compare a voltage level of regulated power supply node 110 and a reference voltage level.

Figure 2:
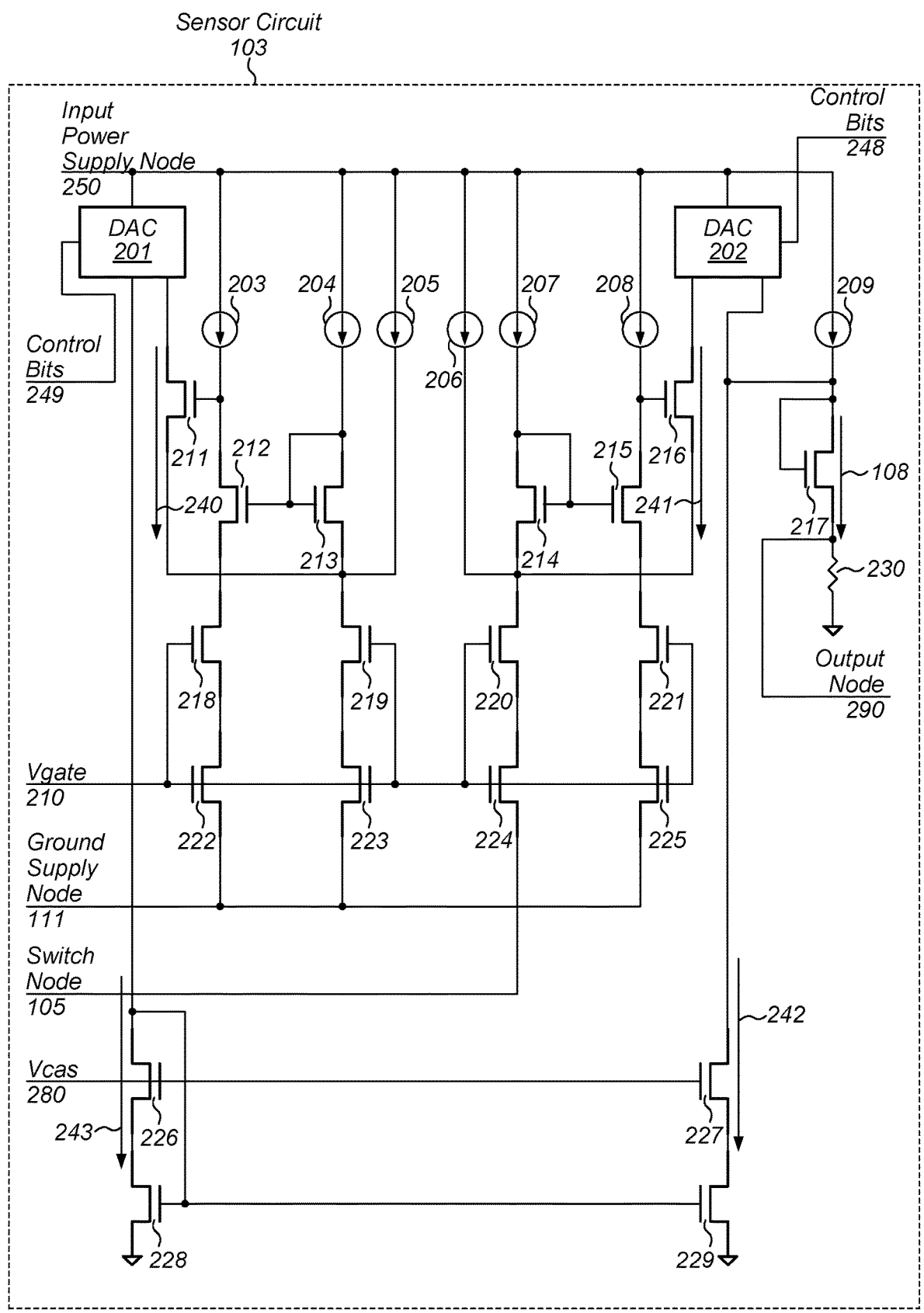
FIG. 2 illustrates a schematic diagram of an embodiment of a current sense circuit.

A schematic diagram of sense circuit 103 is illustrated in FIG. 2. As illustrated, sense circuit 103 includes digital-to-analog converter (DAC) circuits 201 and 202, current sources 203-209, devices 211-229, and resistor 230.

Current source 203 is coupled to device 212 and a control terminal of device 211. Device 212 is further coupled to device 218. Current source 204 is coupled to device 214 as well as the control terminals of devices 212 and 213. Device 213 is further coupled to device 219. Current source 205 is coupled to device 211 and 213. Device 211 is coupled to digital-to-analog converter (DAC) 201.

Current source 208 is coupled to device 215 and a control terminal of device 216. Device 215 is further coupled to device 221. Current source 207 is coupled to device 214 as well as the control terminals of devices 214 and 215. Device 214 is further coupled to device 220. Current source 206 is coupled to device 214 and 216. Device 216 is coupled to DAC 202.

Device 218 is coupled to device 212 and device 222, which is coupled to ground supply node 111. Vgate 210 controls both device 218 and device 222. In a similar fashion, device 219 is coupled to device 213, device 211, current source 205, and device 223, which is coupled to ground supply node 111.

Device 221 is coupled to device 215 and device 225, which is coupled to ground supply node 111. Vgate 210 is coupled to the control terminals of devices 221 and 225. Device 220 is coupled to device 214, current source 206, device 216, and device 224, which is coupled to switch node 105. Vgate 210 is coupled to the control terminals of device 220 and 224. It is noted that a voltage level of Vgate 210 is selected to provide a desired bias current through devices 218-225.

Devices 211, 212, and 213 form an amplifier circuit that is coupled to ground supply node 111 via devices 218, 219, 222, and 223. An operating point of the amplifier circuit is determined using the currents provided by current sources 203, 204, and 205, as well as the voltage level of Vgate 210. Changes in the voltage level of ground supply node 111 resulting from noise generate current 240, which is indicative of the noise in ground supply node 111.

In a similar fashion, devices 214, 215, and 216 form a second amplifier circuit that is coupled to both switch node 105 and ground supply node 111 via devices 220, 221, 224, and 225. An operating point of the second amplifier circuit is determined using the currents provided by current sources 206, 207, and 208, as well as the voltage level of Vgate 210. Changes in the voltage level of switch node 105 that occur during a discharge cycle of voltage regulator circuit 102, generate current 241, which is indicative of the current flowing through inductor 104 into ground supply node 111.

It is noted that devices 211, 212, and 213 are replicas of devices 216, 215, and 214, respectively. As used herein, replica of a device (referred to herein as a "replica device") is a device, which has similar electrical characteristics, e.g., transconductance, to a device, which is being replicated. In some cases, the physical design of a replica device is substantially the same as that of the device being replicated, in order to reduce differences in the electrical characteristics of the devices resulting from variations in lithography.

As illustrated, currents 240 and 241 are scaled using DAC 201 and DAC 202, respectively, to generate currents 243 and 242. In various embodiments, DAC 201 is configured to generate current 243 using current 240. A scale factor used to generate current 243 may be set using control bits 249. For example, control bits 249 may be set to provide a scale factor of two, such that a value of current 243 is twice a value of current 240. In a similar fashion, DAC 202 using current 241 and a scale factor determined by control bits 248 generates current 242.

Current 243 is indicative ground noise current 107 and current 242 is indicative of discharge current 106. As described above, ground noise current 107 and discharge current 106 are combined in order to generate control current 108. In the illustrated embodiment, currents 243 and 242 are combined using a cascode current mirror that includes devices 226-229.

Device 226 is coupled to DAC 201 and device 228, which is coupled to a ground supply node. In some embodiments, device 228 may be coupled to ground supply node 111 or any other suitable node at or near ground potential. The control terminal of device 226 is couple to Vcas 280, and the control terminal of device 228 is coupled to DAC 201.

Device 227 is coupled to DAC 202 and device 229, which is coupled to a ground supply node. In various embodiments, the ground supply node to which device 229 is coupled may be the same ground supply node to which device 228 is coupled. It is noted that, in various embodiments, devices 226-229 form a cascode current mirror, with devices 226 and 227 as cascode devices. Such cascode devices may be used to shield devices 228 and 229 from voltage variations generated by DAC 201 and DAC 202.

The cascode current mirror subtracts current 243 from current 242, such that a component of current 242 that resulted from noise on ground supply node 111, which coupled into device 214, is removed. It is noted that although a cascode current mirror is employed in the embodiment of FIG. 2, in other embodiments, any suitable circuit, e.g., basic current mirror, amplifier circuit, etc., configured to subtract current 243 from current 242 may be employed.

Before control circuit 101 can use current 242, further scaling and buffering may be employed. Such scaling and buffering may be performed by an output stage, which includes current source 209, device 217, and resistors 230. Current source 209 is coupled to device 217, and DAC 202. Device 217 is also coupled to output node 290, which is coupled resistor 230, which, in turn, is coupled to a ground supply node. A current supplied by current source 209 is combined with current 242 generated by DAC 202, to form control current 108. As control current 108 flows through resistors 230 and device 217, a voltage level is developed on output node 290, which may be used by control circuit 101 to determine and end to discharge cycle 109.

Devices 211-229 may be particular embodiments of transistors or other suitable transconductance devices. For example, device 211-229 may be embodiments of metal-oxide semiconductor field-effect transistors (MOSFETs). Current sources 203-209 may, in various embodiments, be particular embodiments of transconductance devices biased a particular operating point to generate a particular current value. For example, current sources 203-209 may include one or more p-channel MOSFETs controlled by respective bias signals.

Figure 3:
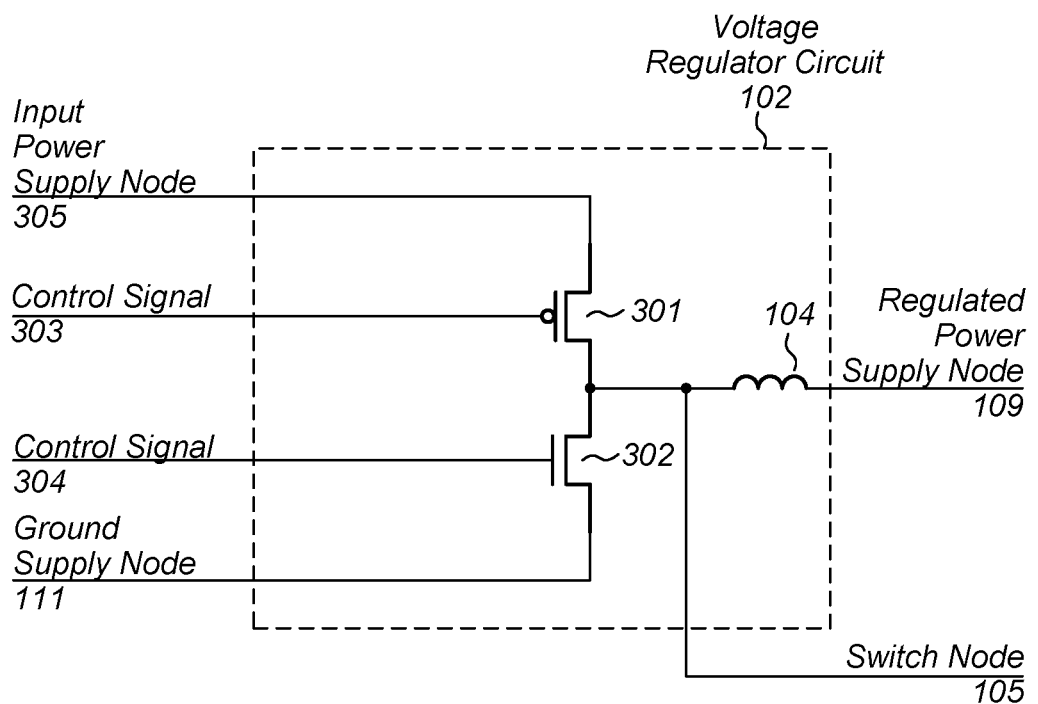
FIG. 3 illustrates a schematic diagram of an embodiment of a voltage regulator circuit included in a power converter circuit.

A schematic diagram of voltage regulator circuit 102 is depicted in FIG. 3. As illustrated, voltage regulator circuit 102 includes devices 301 and 302, which are both coupled to switch node 105, and controlled by control signals 303 and 304, respectively.

In various embodiments, control circuit 101 may generate control signals 303 and 304. Each of control signals 303 and 304 is used to activate a corresponding one of devices 301 and 302 during charge and discharge cycles. During a charge cycle, current is sourced from input power supply node 305 to regulated power supply node 110, and during a discharge cycle, current is sunk from regulated power supply node 110 into ground supply node 111. Alternating between charge and discharge cycles, and adjusting the duration of either of the charge or discharge cycles may maintain a desired voltage level maintained on regulated power supply node 110.

Device 301 is coupled between input power supply node 305 and switch node 105, and is controlled by control signal 303. During a charge cycle, control signal 303 is asserted, which activates device 301 and couples input power supply node 305 to switch node 105, thereby charging switch node 105 by allowing a current to flow from input power supply node 305 to switch node 105, and then onto regulated power supply node 110. As used herein, asserting, or an assertion of, a signal refers to setting the signal to a particular voltage level that activates a circuit or device coupled to the signal. The particular voltage level may be any suitable value. For example, in the case where device 301 is p-channel MOSFET, control signal 303 may be set to a voltage at or near ground potential.

Device 302 is coupled between switch node 105 and ground supply node 111, and is controlled by control signal 304. During a discharge cycle, control signal 304 is asserted, which activates device 302 and couples switch node 105 to ground supply node 111, thereby providing a conduction path from regulated power supply node 110 through inductor 104 into ground supply node 111. While device 302 is active, current flows from regulated power supply node 110 into ground supply node 111, decreasing the voltage level of regulated power supply node 110. As described below in more detail, the duration of the discharge cycle may be based on a value of the current flowing from regulated power supply node 110 into ground supply node 111.

Device 301 and device 302 may be particular embodiments of MOSFETs. In particular, device 301 may be a particular embodiment of a p-channel MOSFET and device 302 may be a particular embodiment of an n-channel MOSFET. Although only two devices are depicted in the embodiment of FIG. 3, in other embodiments, any suitable number of devices, coupled in series or parallel, may be employed to achieve particular electrical characteristics (e.g., on-resistance of the devices).

Figure 4:
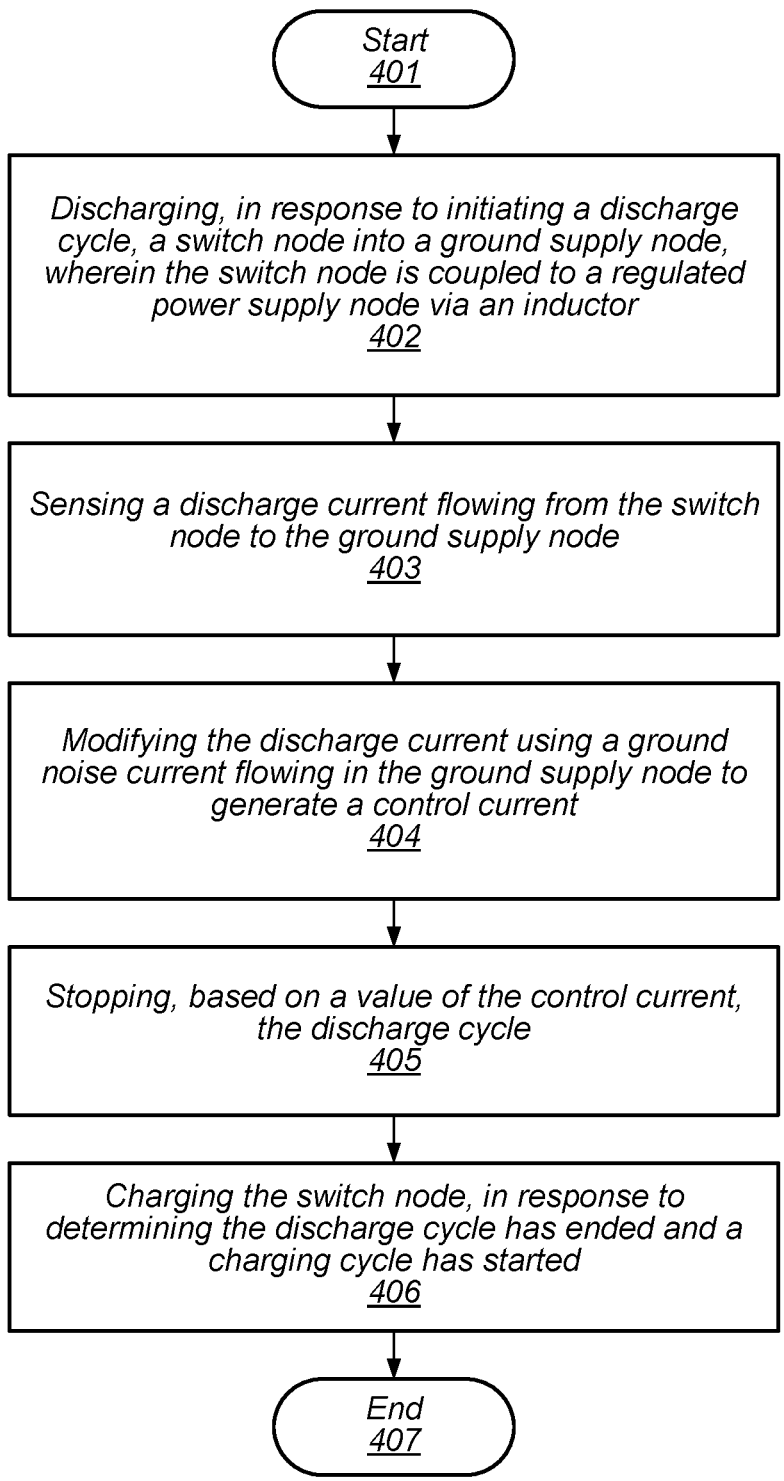
FIG. 4 illustrates a flow diagram depicting an embodiment of a method for operation a power converter circuit.

Turning to FIG. 4, a flow diagram depicting an embodiment of a method for operating a voltage regulator circuit is illustrated. The method, which begins in block 401, may be applied to various power converter circuits, such as power converter circuit 100 as illustrated in FIG. 1.

The method includes discharging, in response to initiating a discharge cycle, a switch node into a ground supply node, where the switch node is coupled to a regulated power supply node via an inductor (block 402). In various embodiments, a control circuit may initiate the discharge cycle in response to detecting a pulse on a clock or other timing signal.

The method further includes sensing a discharge current flowing from the switch node to the ground supply node (block 403). In various embodiments, sensing the discharge current includes generating, by a first amplifier circuit, a first current using a voltage level of the switch node.

Additionally, the method includes modifying the discharge current using a ground noise current flowing the ground supply node to generate a control current (block 404). In various embodiments, when modifying the discharge current, the method may include subtracting the ground noise current from the discharge current. In some embodiments, the method may also include generating, by a second amplifier circuit, a second current using a voltage level of the ground supply node.

The method also includes stopping, based on a value of the control current, the discharge cycle (block 405). In some embodiments, the control circuit may use a voltage level that corresponds to the value of the control current to determine when to stop the discharge cycle. In such cases, the method may include generating an output signal using the control current and at least one resistor. The method may also include performing a level shift operation on a voltage level of the output signal. In some cases, the method my further include adjusting a gain associated with the control current using a digital-to-analog converter circuit.

The method further includes charging the switch node, in response to determining the discharge cycle has ended and a charging cycle has started (block 406). In various embodiments, the method may include stopping the charging cycle, in response to detecting a pulse on a clock or other timing signal. In some cases, a detected pulse may stop the charging cycle and initiate the charging cycle as described above. The method concludes in block 407.

Figure 5:
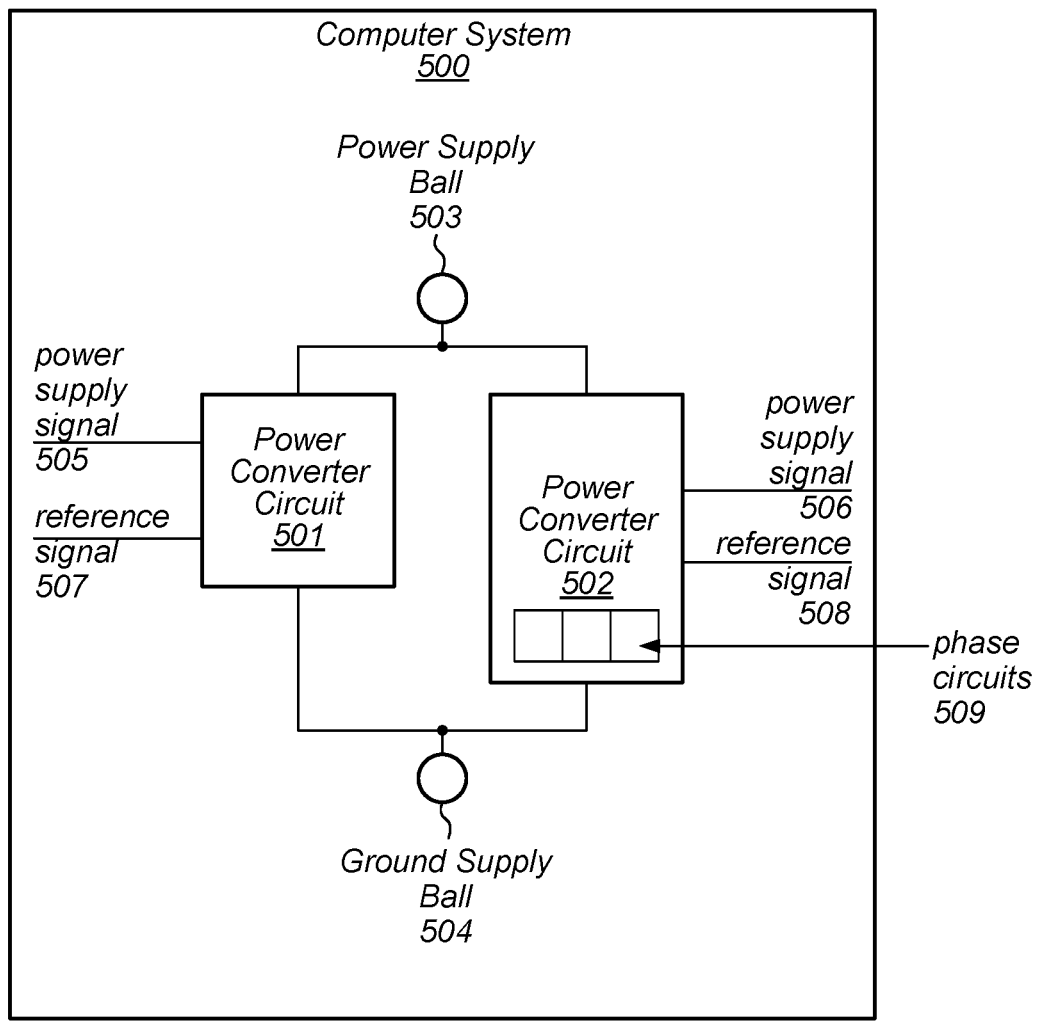
FIG. 5 illustrates a block diagram of multiple power converter circuits sharing power terminals.

Turning to FIG. 5, a block diagram of a computer system is illustrated. As depicted, computer system 500 includes power converter circuits 501 and 502, power supply ball 503, and ground supply ball 504. For the purposes of clarity, other circuit blocks, e.g., processor circuits or memory circuits, have been omitted.

Power converter circuits 501 and 502 may be particular embodiments of power converter 100 as depicted in FIG. 1. As illustrated, power converter circuit 501 is coupled to power supply ball 503 and ground supply ball 504, and is configured to generated power supply signal 505 using reference signal 507. In a similar fashion, power converter circuit 502 is also coupled to power supply ball 503 and ground supply ball 504, and is configured to generate power supply signal 506 using reference signal 508. As illustrated, power converter circuit 502 employs phase circuits 509. As described above, each of phase circuits 509 may include a voltage regulator circuit and a sense circuit similar to those depicted in the embodiment of FIG. 1.

Power supply ball 503 is used to connect computer system 500 to a power supply signal and ground supply ball 504 is used to connect computer system 500 to a ground supply signal. In various embodiments, power supply ball 504 and ground supply ball 504 may be fabricated from solder or other suitable material and may be deposited into predetermined locations corresponding to termination points of conductive paths included in computer system 500. Such conductive paths may be connected to power supply, ground, and other suitable terminals of circuit blocks within computer system 500, e.g., power converter circuit 501. Power supply ball 503 and ground supply ball 504 may, in some embodiments, allow for soldering the system to a circuit board or other suitable substrate.

In some cases, supply noise generated by one power converter circuit may affect the operation of the other power converter circuit since the power converter circuits are coupled to a common set of supply balls. For example, current being discharged from power supply signal 505 into ground supply ball 504 by power converter circuit 501 may result in a ground noise current, e.g., ground noise current 107, flowing in wiring connecting ground supply ball 504 to power converter circuits 501 and 502. As described above, the ground noise current can affect the ability of power converter circuit 502 to accurately sense a current being sunk from power supply signal 506 during a discharge cycle. Such a loss in accuracy of the sensing the current can result in improper detection of a desired endpoint of the discharge cycle. By employing a sense circuit, e.g., sense circuit 103, the effects of power converter circuit 501 on the operation of power converter circuit 502, and vice versa, can be reduced.

Figure 6:
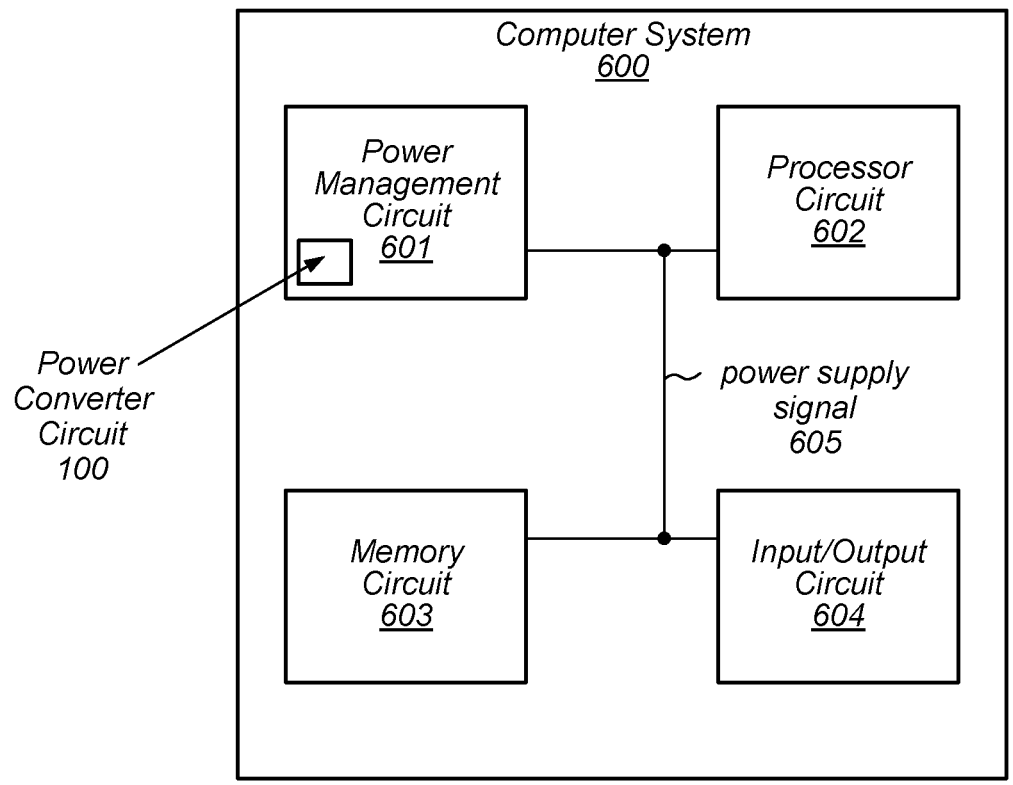
FIG. 6 is a block diagram of one embodiment of a computer system that includes a power converter circuit.

A block diagram of computer system is illustrated in FIG. 6. In the illustrated embodiment, the computer system 600 includes power management unit 601, processor circuit 602, memory circuit 603, and input/output circuits 604, each of which is coupled to power supply signal 605. In various embodiments, computer system 600 may be a system-on-a-chip (SoC) and/or be configured for use in a desktop computer, server, or in a mobile computing application such as, e.g., a tablet, laptop computer, or wearable computing device.

Power management unit 601 includes power converter circuit 100 which is configured to generate a regulated voltage level on power supply signal 605 in order to provide power to processor circuit 602, memory circuit 603, and input/output circuits 604. Although power management unit 601 is depicted as including a single power converter circuit, in other embodiments, any suitable number of power converter circuits may be included in power management unit 601, each configured to generate a regulated voltage level on a respective one of multiple internal power supply signals included in computer system 600. In cases where multiple power converter circuits are employed, two or more of the multiple power converter circuits may be connected to a common set of power terminals that connections to power supply signals and ground supply signals of computer system 600.

Processor circuit 602 may, in various embodiments, be representative of a general-purpose processor that performs computational operations. For example, processor circuit 602 may be a central processing unit (CPU) such as a microprocessor, a microcontroller, an application-specific integrated circuit (ASIC), or a field-programmable gate array (FPGA).

Memory circuit 603 may in various embodiments, include any suitable type of memory such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example. It is noted that although in a single memory circuit is illustrated in FIG. 6, in other embodiments, any suitable number of memory circuits may be employed.

Input/output circuits 604 may be configured to coordinate data transfer between computer system 600 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 604 may be configured to implement a version of Universal Serial Bus (USB) protocol or IEEE 1394 (Firewire®) protocol.

Input/output circuits 604 may also be configured to coordinate data transfer between computer system 600 and one or more devices (e.g., other computing systems or integrated circuits) coupled to computer system 600 via a network. In one embodiment, input/output circuits 604 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 604 may be configured to implement multiple discrete network interface ports.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
    a voltage regulator circuit including a switch node coupled to a regulated power supply node via an inductor, wherein the voltage regulator circuit is configured, in response to an initiation of a discharge cycle, to discharge the switch node into a ground supply node;
    a sense circuit configured to:
       sense a discharge current flowing from the switch node to the ground supply node;
       sense a noise current flowing in the ground supply node;
       modify the discharge current using the noise current to generate a control current; and
    a control circuit configured to halt, based on a value of the control current, the discharge cycle.

2. The apparatus of claim 1, wherein to modify the discharge current, the sense circuit is further configured to subtract the noise current from the discharge current.

3. The apparatus of claim 1, wherein the sense circuit is further configured to generate an output signal whose voltage level is based on the value of the control current.

4. The apparatus of claim 1, wherein the sense circuit includes a first amplifier circuit configured to generate a first current using a first voltage level of the switch node, and a second amplifier circuit configured to generate a second current using a second voltage level of the ground supply node.

5. The apparatus of claim 4, wherein the sense circuit includes a first digital-to-analog converter circuit configured to generate a third current using the first current, and a second digital-to-analog converter circuit configured to generate a fourth current using the second current.

6. The apparatus of claim 5, wherein the sense circuit includes a current mirror circuit configured to combine the third current and the fourth current to generate the control current.

7. A method, comprising:
    discharging, in response to initiating a discharge cycle, a switch node into a ground supply node, wherein the switch node is coupled to a regulated power supply node via an inductor;
    sensing a discharge current flowing from the switch node to the ground supply node;
    sensing a noise current flowing in the ground supply node;
    modifying the discharge current using the noise current to generate a control current;
    stopping, based on a value of the control current, the discharge cycle; and
    charging the switch node in response to determining the discharge cycle has ended and a charging cycle has started.

8. The method of claim 7, wherein modifying the discharge current using the noise current includes subtracting the noise current from the discharge current.

9. The method of claim 7, wherein sensing the discharge current includes generating, by a first amplifier circuit, a first current using a voltage level of the switch node.

10. The method of claim 9, further comprising, scaling the first current using a first digital-to-analog converter circuit.

11. The method of claim 9, further comprising, generating, by a second amplifier circuit, a second current using a voltage level of the ground supply node.

12. The method of claim 11, further comprising, scaling the second current using a second digital-to-analog converter circuit.

13. The method of claim 7, further comprising generating an output signal using the control current and at least one resistor.

14. An apparatus, comprising:
    a first power converter circuit coupled to an input power supply node and a ground supply node, wherein the first power converter circuit is configured to generate a first regulated voltage level on a first power supply node; and
    a second power converter circuit coupled to the input power supply node and the ground supply node, wherein the second power converter circuit includes a switch node coupled to a second power supply node via an inductor, wherein the second power converter circuit is configured to:
       charge the switch node for a particular time period;
       in response to an end of the particular time period, discharge the switch node by sinking a discharge current from the switch node into the ground supply node;
       sense a noise current flowing in the ground supply node;
       generate a control current using the discharge current and the noise current; and
       halt the discharge of the switch node based on a value of the control current.

15. The apparatus of claim 14, wherein to charge the switch node, the second power converter circuit is further configured to activate a device coupled between the input power supply node and the switch node.

16. The apparatus of claim 14, wherein to discharge the switch node, the second power converter circuit is further configured to activate a device coupled between the switch node and the ground supply node.

17. The apparatus of claim 14, wherein to generate the control current, the second power converter circuit is further configured to subtract the noise current from the discharge current.

18. The apparatus of claim 14, wherein to halt the discharge of the switch node, the second power converter circuit is configured to compare the control current to a demand current whose value is based on a comparison of a voltage level of the second power supply node to a reference voltage level.

19. The apparatus of claim 14, wherein the second power converter circuit further includes a first amplifier circuit configured to generate the noise current using a first voltage level of the ground supply node, and a second amplifier circuit configured to determine a value of the discharge current using a second voltage level of the switch node.

20. The apparatus of claim 14, wherein the second power converter circuit is further configured to generate an output signal using the control current.

* * * * *